US007212783B2

(12) United States Patent
Gaumond et al.

(10) Patent No.: US 7,212,783 B2
(45) Date of Patent: May 1, 2007

(54) SYSTEM AND METHOD FOR MANAGING CONTENT BETWEEN DEVICES IN VARIOUS DOMAINS

(75) Inventors: Michael T. Gaumond, Scottsdale, AZ (US); Richard M. Clayton, Phoenix, AZ (US); Parvathy Bhaskaran, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 242 days.

(21) Appl. No.: 10/885,995

(22) Filed: Jul. 7, 2004

(65) Prior Publication Data

US 2006/0010480 A1    Jan. 12, 2006

(51) Int. Cl.
  *H04H 7/00* (2006.01)
(52) U.S. Cl. .................. 455/3.06; 455/3.04; 455/3.02; 455/3.03
(58) Field of Classification Search .............. 455/3.04, 455/3.02, 3.06, 418, 419, 420, 556.1, 41.2, 455/427, 557, 12.1; 725/134; 370/352
See application file for complete search history.

(56) References Cited

U.S. PATENT DOCUMENTS

| | | |
|---|---|---|
| 5,721,827 A | 2/1998 | Logan |
| 5,732,216 A | 3/1998 | Logan |
| 5,815,671 A | 9/1998 | Morrison |
| 5,892,536 A | 4/1999 | Logan |
| 5,986,692 A | 11/1999 | Logan |
| 6,088,455 A | 7/2000 | Logan |
| RE36,801 E | 8/2000 | Logan |
| 6,125,398 A | 9/2000 | Mirashrafi |
| 6,199,076 B1 | 3/2001 | Logan |
| 6,233,389 B1 | 5/2001 | Barton |
| 6,327,418 B1 | 12/2001 | Barton |
| 6,330,334 B1 | 12/2001 | Ryan |
| 6,330,337 B1 | 12/2001 | Nicholson |
| 6,389,463 B2 * | 5/2002 | Bolas et al. ................. 709/219 |
| 6,490,432 B1 | 12/2002 | Wegener |
| 6,567,660 B1 | 5/2003 | Wegener |
| 6,608,994 B1 | 8/2003 | Wegener |
| 6,609,097 B2 | 8/2003 | Costello |
| 6,622,007 B2 | 9/2003 | Linden |
| 6,630,963 B1 | 10/2003 | Billmaier |
| 6,680,923 B1 | 1/2004 | Leon |
| 6,710,815 B1 | 3/2004 | Billmaier |
| 2002/0013852 A1 | 1/2002 | Janik |
| 2002/0031120 A1 | 3/2002 | Rakib |
| 2002/0059637 A1 | 5/2002 | Rakib |
| 2002/0068558 A1 | 6/2002 | Janik |

(Continued)

*Primary Examiner*—Matthew D. Anderson
*Assistant Examiner*—Tan Trinh
(74) *Attorney, Agent, or Firm*—Thomas V. Miller; Terri S. Hughes

(57) ABSTRACT

A system and method for managing content between different client devices in various domains (such as vehicle, home, and person). The system and method include receiving an input from a user on the first client device to delay the content. After receiving the input, the first client device determines whether the first client device is connected to a wireless communication system. If the first client device is connected to the wireless communication system, the first client device sends a data message to a host system. In one embodiment, the host system will then obtain the content (in whole or in part) after receiving the data message to permit the user to resume playback of the content on the first client device or another client device.

78 Claims, 9 Drawing Sheets

U.S. PATENT DOCUMENTS

| | | |
|---|---|---|
| 2002/0164973 A1 | 11/2002 | Janik |
| 2002/0178279 A1 | 11/2002 | Janik |
| 2002/0183059 A1* | 12/2002 | Noreen et al. ............. 455/427 |
| 2003/0025599 A1 | 2/2003 | Monroe |
| 2003/0054758 A1* | 3/2003 | Kawamata et al. ........ 455/3.04 |
| 2003/0193895 A1 | 10/2003 | Engwer |
| 2003/0216120 A1* | 11/2003 | Ceresoli et al. ............ 455/3.02 |
| 2003/0229900 A1 | 12/2003 | Reisman |
| 2004/0003400 A1 | 1/2004 | Camey |
| 2004/0033821 A1 | 2/2004 | Slesak |
| 2004/0073536 A1 | 4/2004 | Smith-Semedo |
| 2005/0009561 A1* | 1/2005 | Hollstrom et al. ....... 455/556.1 |

* cited by examiner

USER1

| Device ID | Client Type | Domain | Short-Range Transceiver | Cellular Transceiver | Memory Size | Stored Content | Internet Content | Satellite Content | RF Radio Content | Cable TV Content | ... |
|---|---|---|---|---|---|---|---|---|---|---|---|
| D1 | Head-Unit | Vehicle | Y | Y | XXX | Y | N | Y | Y | N | ⋮ |
| D2 | PC | Home | Y | N | XXX | Y | Y | Y | N | N | ⋮ |
| D3 | Audio Recorder | Home | Y | N | XXX | Y | N | N | N | N | |
| D4 | Video Recorder | Home | Y | N | XXX | Y | N | Y | N | N | |
| D5 | Cell Phone | Person | Y | Y | XXX | Y | N | N | N | N | |
| D6 | MP3 Player | Person | Y | N | XXX | Y | N | N | N | N | |
| D7 | PDA | Person | Y | Y | XXX | Y | Y | N | N | N | |
| ... | ... | ... | ... | ... | ... | ... | ... | ... | ... | ... | |

FIG. 7

SYSTEM AND METHOD FOR MANAGING CONTENT BETWEEN DEVICES IN VARIOUS DOMAINS

FIELD OF THE INVENTION

This invention in general relates to managing content between devices in various domains and, more particularly, to a system and method for delaying or time-slipping broadcast content across different domains.

BACKGROUND OF THE INVENTION

Digital video recorders and other content storage devices exist that allow a user to store and playback content at later times. Conventional systems, however, are limited in that they deal with storage and playback of the broadcast content in a single domain.

A need exists for a user to seamlessly listen to (or watch) audio (or video) content when moving from one domain (such as a vehicle) to a different domain (such as a home) without missing a portion of that content. For instance, assume that a vehicle operator would like to listen to a talk show or a sporting event that is scheduled for broadcasting one hour before the operator's commute time. It may not be feasible for the vehicle to store the broadcast itself because the vehicle is turned off and the operator does not want to drain the vehicle's battery. Currently, a user cannot delay the playback of the originally broadcast program to a time period when the driver is in the vehicle. The same applies for video, e.g., delay the playing of a regularly scheduled video program on an entertainment system in the vehicle for a time that the occupants may be in the vehicle.

It is, therefore, desirable to provide a system and method to overcome or minimize most, if not all, of the preceding problems especially in the area of managing content in different domains.

BRIEF DESCRIPTION OF THE DRAWINGS

FIG. 7 is a diagram of one embodiment of a database that may reside in a host system to access information and characteristics about a particular client device;

Figure 1:
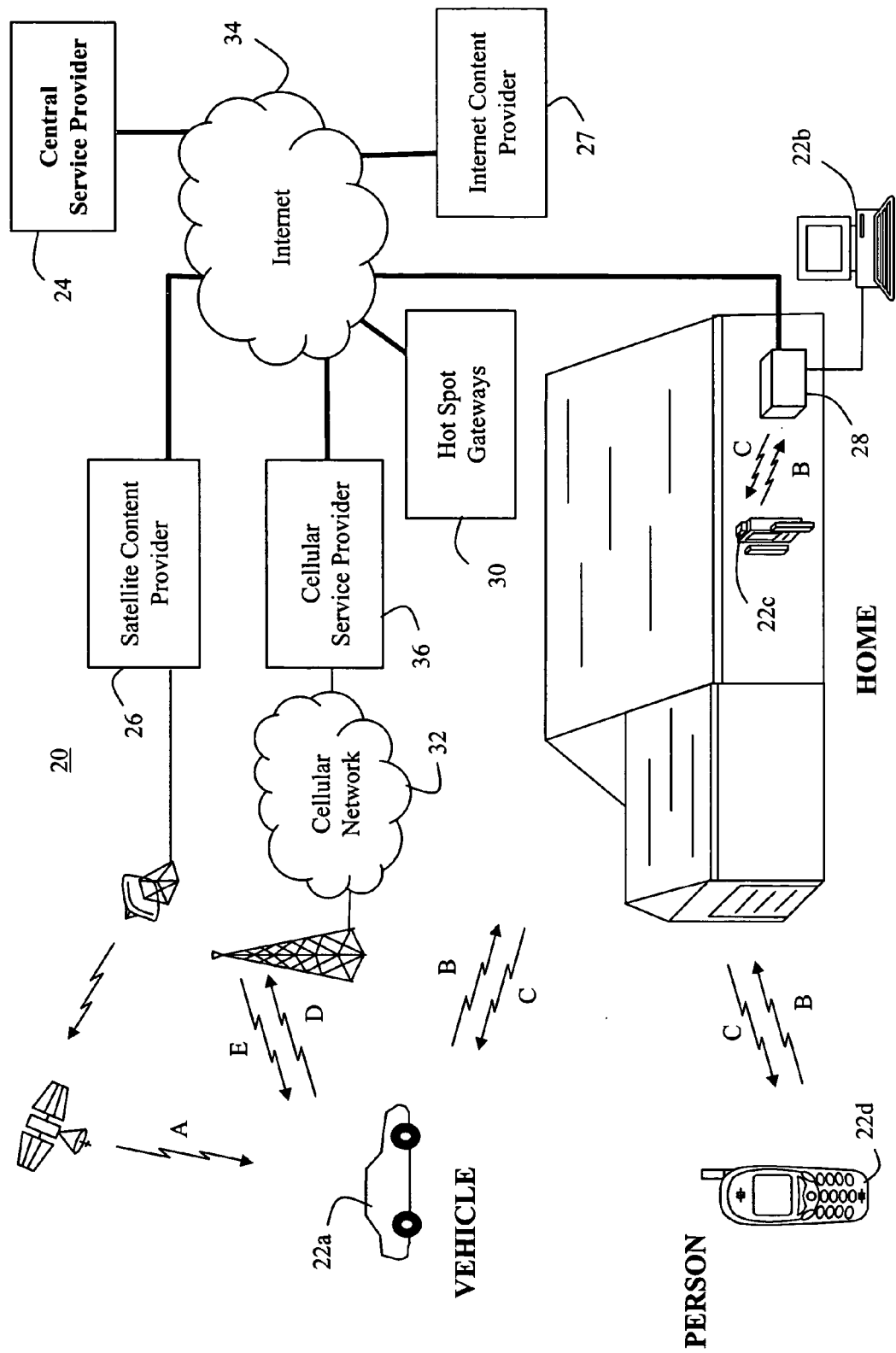
FIG. 1 is a block diagram of a system having client devices in different domains supported by a host system located at a home or at a central service provider.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for managing content between different client devices in various domains (such as vehicle, home, person, hotspot, workplace, or school). To this end, in one embodiment there is a method for managing content that is scheduled for broadcast during a first time period. The method comprises the steps of: receiving an input from a user on a first device to delay the content to a second time period, the second time period being different from the first time period; determining whether the first device is connected to a first wireless communication system; sending a data message to a host controller if the first device is connected to the first wireless communication system; and obtaining the content scheduled for broadcast during the first time to permit the user to playback the content during the second time period.

The broadcast content may be obtained in a variety of ways. The broadcast content could be obtained by the host controller from a content provider through an Internet connection. The broadcast content may also be obtained by the host controller through a digital satellite communication system that will store the broadcast content during the first time period. Broadcast content may also be obtained from local radio broadcasters over a radio tuner.

Moreover, the step of obtaining the content may further include a determination of whether a broadcast program is stored in whole or in part. If the broadcast program is stored in part, then the host system will store a first segment of the broadcast program and send the first segment of the broadcast program to the first device. The first device will then begin recording the second segment of the broadcast program and connect or overlap the first segment to the second segment of the broadcast program to provide seamless playback to the user.

In one embodiment, the first communication system is a short-range wireless communication system such as a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system. The first device may also include a second transceiver for communication with a second wireless communication system such as a cellular communication network. In a further embodiment, where the first device has a second transceiver, the method may further include the steps of: determining whether the first device is connected to the second wireless communication system and sending the data message over the second wireless communication system if a connection exists. If the first client device is not connected to either the first or second wireless communication system, the first client device may store the data message for later transmission.

In another embodiment, there is a method for managing content between a first client device and a second client device that is scheduled for broadcast during a first time period, where the first client device is in a first domain (such as a vehicle) and the second client device is in a second domain (such as in a home or on the person). The method comprises the steps of: receiving a data message from the first device over a wireless communication system, the data message being received in response to an input from a user on the first device to delay the content to a second time period; obtaining the content scheduled for broadcast during the first time period; and sending the content to the second device over the wireless communication system to permit the user to playback the content on the second device during the second time period. Here, the data message sent to the wireless gateway comprises a plurality of information elements that includes at least a store content instruction. Additionally, the method may further include the steps of determining a content type associated with the second device and formatting the content in the content type associated with the second device before sending the content to the second device.

In a further embodiment, there is a client device in a communication system where the system is capable of managing content that is scheduled for broadcast during a first time period. The client device includes at least a user interface, a first wireless transceiver, a controller, and a memory. The user interface is used to receive an input from a user to access content during a second time period where the second time period is different from the first time period. The first wireless transceiver is capable of wirelessly connecting the client device to a first wireless communication system. The controller, in response to the input from the user, determines whether the client device is connected to the first wireless communication system. If so, the controller generates and sends a data message to a remote host controller over the first communication system. The data message sent to the wireless gateway includes at least a delay content instruction and any additional information as described in more detail below. The memory is used for storing the content that is scheduled for broadcast during the first time period. The content stored in memory is received from the remote host controller in response to the data message sent to the remote host controller. The content may be an entire program broadcast or be a smaller segment of the original program broadcast.

In another embodiment, there is a host system for managing content for a mobile client device that is scheduled for broadcast during a first time period. The mobile client device is selected from one of the domains mentioned above. The host system includes at least a wireless gateway, a database, and a controller. The wireless gateway is configured to receive a data message from the client device that includes a delay content instruction. The data message comprises a plurality of information elements including at least a store content instruction. The database is configured to store information regarding the client device and any other client devices of the user. The controller is connected to the wireless gateway and the database. The controller is capable of identifying the client device from the database and obtaining the content scheduled for broadcast during the first time period. The controller then sends the content to the client device over the wireless communication system to permit the user to playback the content on the client device during the second time period.

Now, turning to the drawings, FIG. 1 illustrates a top-level block diagram of an example use of a communication system 20 for the present invention. Generally, the communication system 20 may include a plurality of client devices 22a, 22b, 22c, 22d that exist in various domains such as the vehicle, home, and person. For instance, a client device 22a in the vehicular domain may be incorporated into a vehicle's head unit and/or entertainment system. A client device 22b, 22c in the home domain may include items such as a personal computer, a home entertainment system, a digital audio recorder, and/or a digital video recorder. A client device 22d in the personal domain may include items such as a portable electronic device such as a personal digital assistant (PDA), a digital music player, and/or a portable phone. Client devices may also exist in other domains such as a hotspot, workplace, or school.

The communication system 20 also includes a central service provider 24 that can communicate with the client devices 22a–d through a combination of wireless and wired links. In one embodiment, the central service provider 24 is connected to a high-speed Internet network 34. The central service provider 24 may assist in managing the distribution and control of content between different client devices 22a–d. The central service provider 24 may further provide additional services or be incorporated into the services of other service providers such as a cellular service provider, a satellite broadcast content provider, a cable television content provider, or a stored Internet content provider. Moreover, some or all of the functions of managing the distribution and control of the content between client devices 22a–d may reside locally with a user in the home domain.

In one embodiment, where the client device 22a–d has a content receiver, the client devices 22a–d may receive broadcast content (audio and/or video) from a satellite content provider 26. This is shown in FIG. 1 through an exemplary satellite content provider and the receipt of a communication link A to the client devices 22a–d. In other embodiments, the client device 22a–d may also have a receiver to receive broadcast content via radio signals from local content broadcasters (not shown). The client device 22a–d may also receive stored content from an Internet content provider 27. The Internet content provider 27 may provide stored broadcast content to users or be part of a cable television provider. If the client device is a portable or mobile unit (such as a client device 22a in the vehicular domain or a client device 22d in the person domain), as explained in more detail below, the client device may receive stored broadcast content from a home gateway 28 or a hot spot gateway 30 through a short-range communication system.

As illustrated in FIG. 1, the client devices 22a–d may wirelessly communicate in the communication system 20 through different communication links (see communication arrows B-E). The wireless communication links B-E may be divided into individual sets (B-C, D-E) for different types of wireless communication protocols. For instance, the client devices 22a–d may include a first wireless transceiver that is capable of establishing a wireless communication link B–C through a short-range wireless communication system or network. In this embodiment, the short-range wireless communication system or network may include a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system. The short-range wireless transceiver in a client device 22a–d may provide direct communication to another client device 22a–d through a home wireless gateway 28 (such as from the client device 22a in the vehicle to the client device 22b, 22c in the home). Alternatively, the short-range wireless transceiver in a client device 22a–d may provide indirect wireless communication to another client device through a hot spot gateway 30 (such as from a client device 22a in the vehicle, through the hot spot gateway 30, to the client device 22b, 22c in the home). The wireless communication links over the short-range communication system can provide for the exchange of data messages as well as the transfer of stored broadcast content to client devices.

Additionally, the client devices 22a–d may include a second wireless transceiver that is capable of establishing a wireless communication link D-E through a second wireless communication system, such as a cellular communication system and network 32. The cellular communication system and network 32 can operate according to a wireless communication protocol such as a Global System for Mobile Communications (GSM) protocol, a Universal Mobile Telphony System (UMTS) protocol, a Code Division Multiple Access (CDMA) protocol, a Wideband CDMA (WCDMA) protocol, a CDMA2000 protocol, or a Time Division Multiple Access (TDMA) protocol. Here, the cellular system or network 32 is further coupled to the Internet 34 by the cellular service provider 36 or other wired network on route to the central service provider 24, which may ultimately act as the host for data message communications between client devices 22a–d. Alternatively, the cellular system or network 32 is coupled to the Internet 34 or other wired network on route to another client device (such as from the client device 22a in the vehicle, through to the cellular network provider 36, to the client device 22b, 22c in the home). The above described wireless communication protocols are merely representative of existing protocols that could be used in the present invention.

Figure 2:
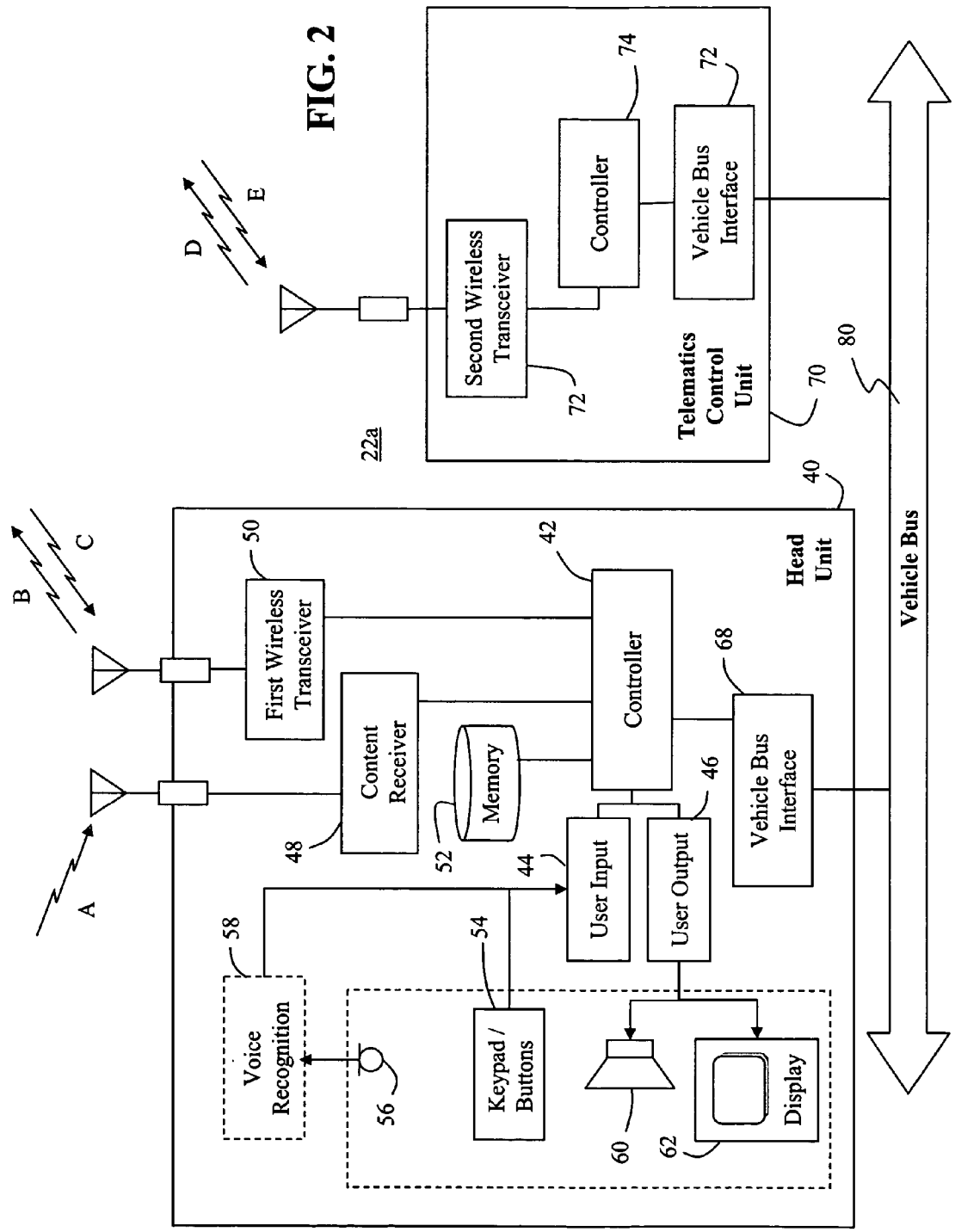
FIG. 2 is a block diagram of one embodiment of a client device.
Figure 3:
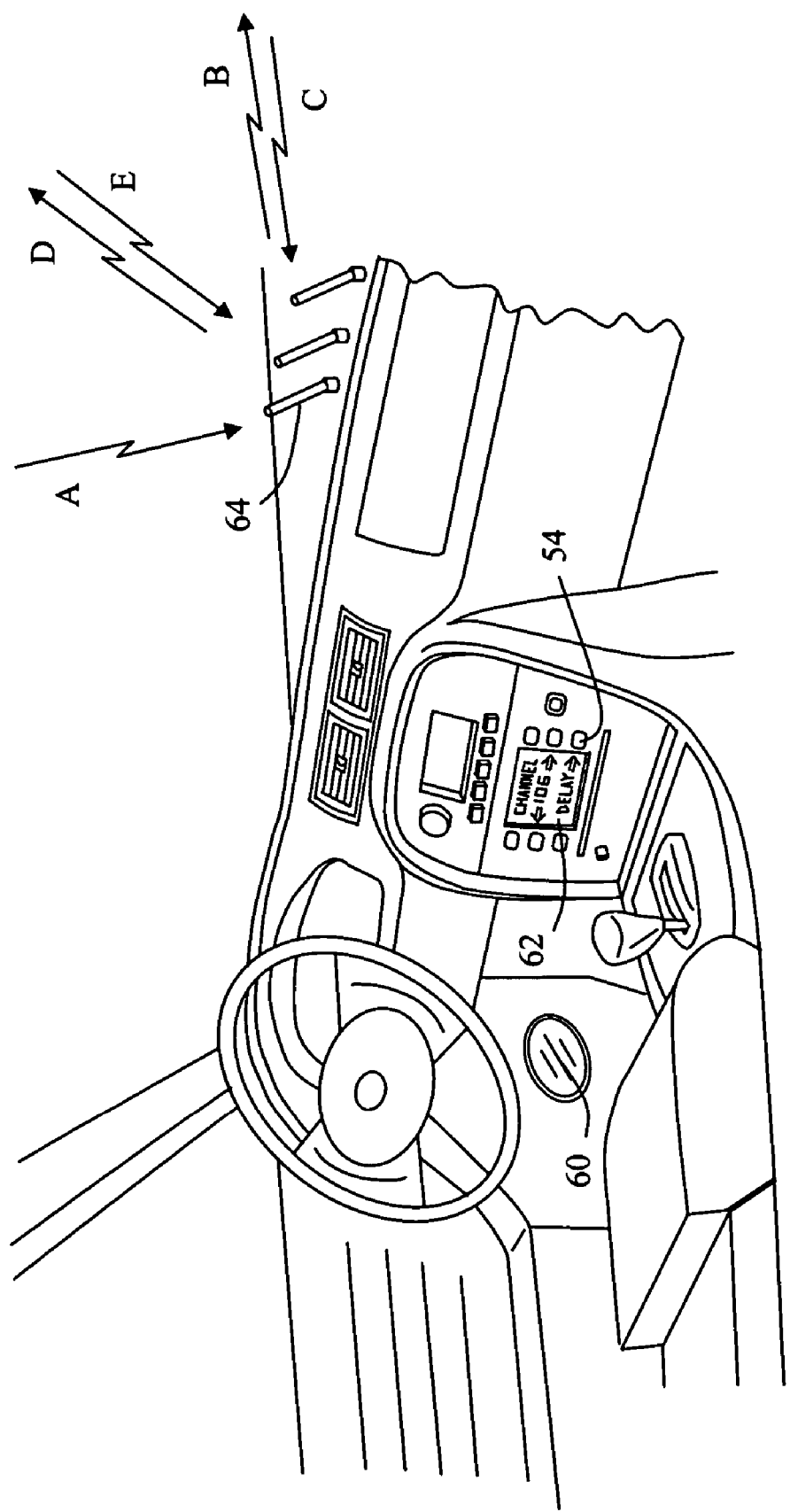
FIG. 3 is a perspective view of the inside of a vehicle illustrating one embodiment of a client device in the vehicular domain.
Figure 4:
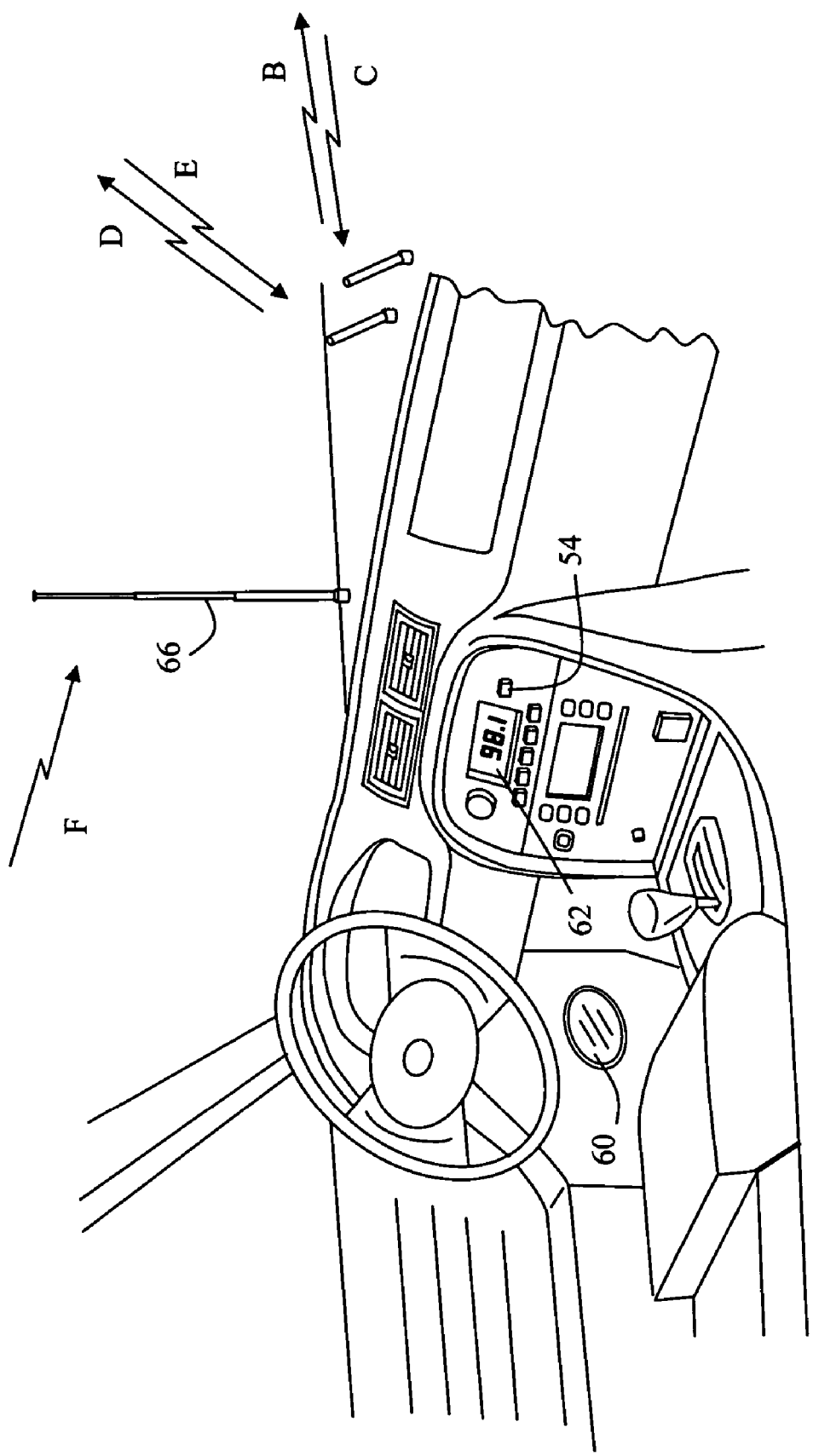
FIG. 4 is a perspective view of the inside of a vehicle illustrating another embodiment of a client device in the vehicular domain.

An exemplary client device 22a in a vehicular domain will now be described in further detail with relation to FIGS. 2–4. In one embodiment, a client device 22a in a vehicle may comprise of two main components: a head unit 40 and a Telematics control unit 70. Although shown as separate components for purposes of illustration, one skilled in the art having the benefit of this disclosure will recognize that aspects of the head unit 40 and the Telematics control unit 70, and components thereof, can be combined or swapped. In any event, in the embodiment as shown in FIG. 2, the head unit 40 may include a controller 42, a user interface 44, 46, a content receiver 48, a first wireless transceiver 50, a memory 52.

The user interface includes a user input 44 and a user output 46. The user input 44 may include a keypad or a specific user dedicated set of buttons 54. The user may use the keypad or dedicated buttons to perform particular functions of the present invention, including a request to delay or reschedule content that is scheduled for a first time period. As described in more detail below, the user may request that broadcast content that is originally scheduled for a first time period be delayed to a second time period. The present invention is particular advantageous for users that want to re-schedule and delay an original broadcast to fit the user's personal schedule. For instance, if the user knows that they regularly commute to work at 7:00 am but would like to listen to a broadcast (such as a talk show) that begins at 6:30 am, the user may specify that the broadcast be delayed or otherwise time-slipped by 30 minutes. Alternatively, the broadcast content could be delayed to a later time after receiving further input from the user. In addition to allowing the user to provide a delay request through the user interface in the vehicular client device 22a, the user may also make this selection from another client device 22b–22d (such as a personal computer or another mobile device) that is directed to the vehicular client device 22a. Additionally, a microphone 56 in the client device 22a may also be used to pick up a speaker's voice in the vehicle, and/or possibly to give commands to the head unit 40 if it is equipped with a voice recognition module 58.

Ultimately, user inputs 44 are processed by the controller 42 in the head unit 40. The controller 42 also executes processes to provide outputs to the occupants in the vehicle through the user output 46, such as through a speaker 60 and/or a display 62. The speakers 60 employed can be the audio (radio) speakers normally present in the vehicle, of which there are typically four or more, although only one is shown for convenience.

The content receiver 48 in the client device 22a is capable of receiving broadcast content (audio and/or video) from a content provider 26. This is shown in FIG. 3 through an exemplary satellite content provider by the receipt of a communication link A to the client device 22a. The user may use the user interface to select one of a plurality of satellite channels that are received by the satellite receiver antenna 64. In other embodiments, as shown in FIG. 4, the client device 22a may also have an antenna 66 and a radio receiver to receive broadcast content via radio signals F from local content broadcasters in the geographic area. This type of broadcast content may be obtained through the content receiver 48 by tuning a radio receiver to a specific radio frequency.

Referring back to FIG. 2, the client device 22a may also obtain stored broadcast content (as well as exchange data messages with a host system or other client devices) through the use of the first wireless transceiver 50. The first wireless transceiver 50 is used for establishing wireless communications B–C over a short-range wireless communication system or network as discussed above. Although shown as part of the head unit 40, the first wireless transceiver 50 could also be included as part of the Telematics control unit 70 or other vehicle control unit. In any event, the short-range wireless transceiver 50 may provide wireless communication to a remote host system 90 (see FIG. 6) over a home gateway 28 or may provide wireless communication to a remote host controller 90 through a hot spot gateway 30.

Additionally, the client device 22a includes a memory 52 for storing broadcast content. In one embodiment, the type of content stored in memory 52 may include content that was scheduled for broadcast during an original broadcast time that the user wishes to playback during a later second time period. The content may be received through the first wireless transceiver 50 from the home gateway 28. For instance, assume that a user of the vehicular client device 22a would like to delay the listening of specific broadcast content that is scheduled during an original first time period. The user may select an input (either on the client device 22a or from another client device 22b–22d) to delay the playback of an original broadcast program content. A remote host system 90 will obtain the content (in whole or in part) and send the content to the client 22a for storage in memory 52. The content would then be automatically played back to the user at the designated second time period.

In the embodiment where the client device 22a is incorporated into the head unit 40 of a vehicle, the controller 42 may also be configured to communicate via a vehicle bus interface 68 to a vehicle bus 80, which carries communication information and other operational data throughout the vehicle. This connection may be important to allow the controller 42 to utilize a cellular communication transceiver in the Telematics control unit 70 to transmit and receive data messages. In particular, the Telematics control unit 70 is similarly coupled to the vehicle bus 80, via a vehicle bus interface 72, and hence the head unit 40. The Telematics control unit 70 is responsible for sending and receiving voice or data communications to and from the vehicle over a cellular communication network. As such, it comprises a Telematics controller 74 to organize such communications, and a network access device (NAD) that includes a cellular wireless transceiver 76, which may be used as a second wireless transceiver for purposes of the present invention as described further below.

In an alternative embodiment, the client device 22a may be configured to seek out a local wireless communication device to determine whether a data message may be sent over a second wireless communication system. For instance, in FIG. 5, the controller 42 in the client device 22a may determine whether it has access to a second wireless communication network through another wireless communication device 110 that is within proximity of the short-range wireless transceiver 50. Here, the wireless communication device 110, such as a cellular phone, has its own controller 112, a short-range wireless transceiver 114 and a cellular wireless transceiver 116. The short-range wireless transceivers 50 and 114 may communication with each other through a short-range communication protocol. The benefit of this design is that it will allow the controller 42 to utilize a cellular transceiver in the local wireless communication device 110 to transmit and receive data messages, which may be used as a second wireless transceiver for purposes of the present invention as described further below.

Figure 5:
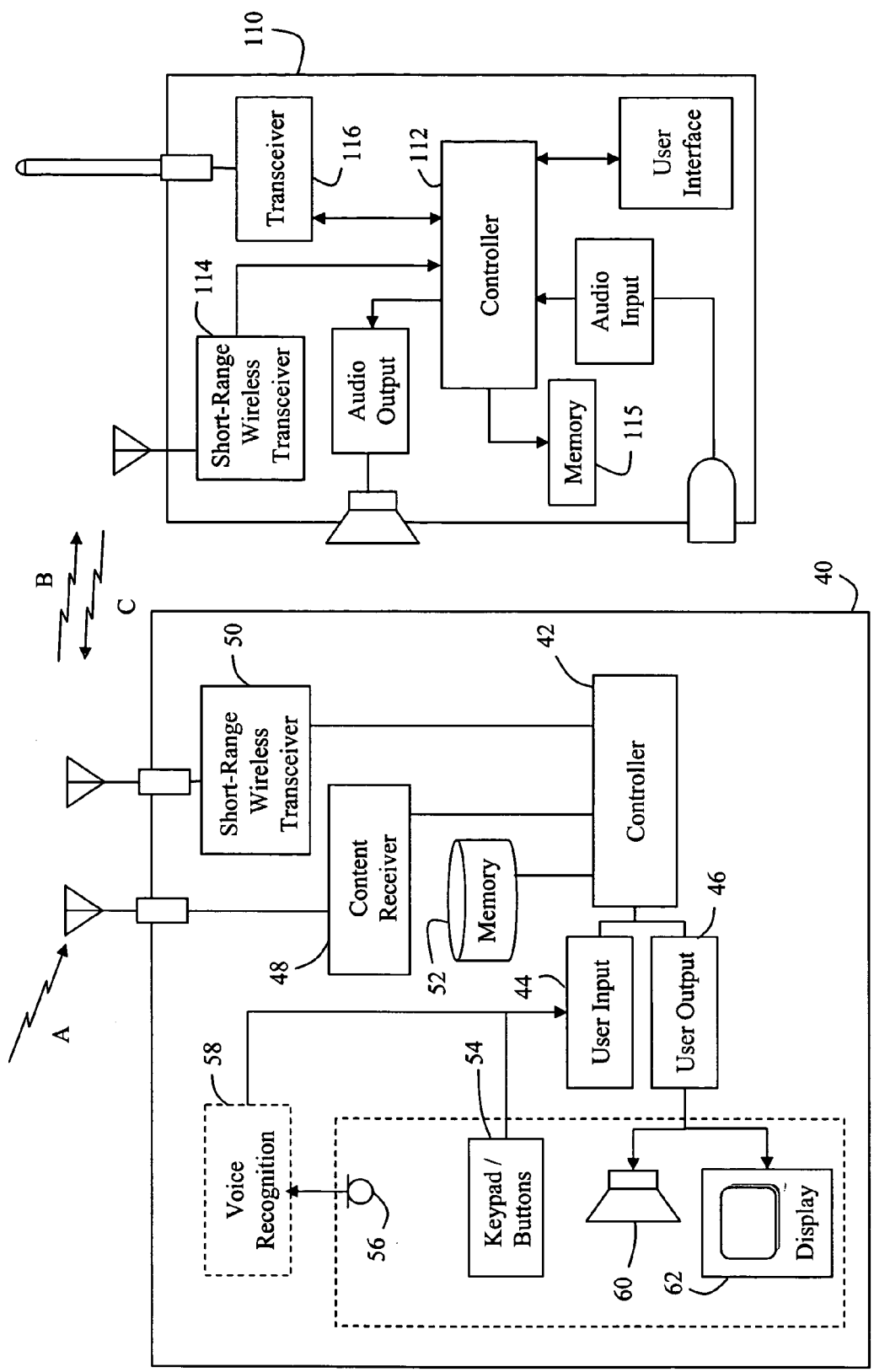
FIG. 5 is a block diagram of another embodiment of a client device in communication with a separate local wireless communication device.

In a further embodiment, the wireless communication device 110 in FIG. 5 could serve as a client device itself. For instance, the wireless communication device 110 may include a controller 112, a memory 115, and transceivers 114, 115. In this case, the audio or video from any content stored on the wireless communication device 110 could be sent or transmitted over the short-range wireless transceiver 114 to another system or device, such as the head unit 40 in a vehicle. The transmitted audio or video may then be outputted over the speakers 60 or display 62.

The client device 22a illustrated above can provide a great deal of communicative flexibility within vehicle to manage and control content with other client devices 22b–d owned by a user. For example, assume for purposes of illustration that a driver of the vehicle, using client device 22a, is driving to his/her workplace in the morning and hears an advertisement through their content receiver 48 for a broadcast program such as a talk show or a sporting event that is scheduled for broadcast during the driver's work day (e.g., beginning at 2 pm). However, the driver is unable to listen to the broadcast program during its originally scheduled time period because the driver will be at work. The present invention allows the driver to delay the playback of that originally broadcast program to a later time when the driver will be back inside the vehicle (e.g., the commute home from work at 5:30 pm). The driver can initiate this function by submitting an input that requests the content to start at a second time period such as 5:30 pm or at another time specified by the driver. In response to the user's input, the controller 42 in the client device 22a will send a data message to a remote host controller through either the first wireless transceiver 50 (short-range transceiver) or through the second wireless transceiver 72 (cellular transceiver), depending on the location of the client device 22a. The remote host controller will obtain the originally scheduled broadcast content and then send the content to the client device 22a for subsequent playback to the driver during the driver's designated time period. In one embodiment, the content may be sent to the client device 22a, from the remote host controller, through a hot spot gateway 30 that is located at the driver's workplace.

The example provided above presents a situation where the entire broadcast program is obtained by the home gateway 28 and sent to the client device for later playback. The present invention also solves the problem where the user of the client device 22a only wants to delay or time-slip the content over a relatively short period of time. For instance, in another illustrative example, the driver of a vehicle having a client device 22a may know that a regularly scheduled talk show starts at 6:30 am and would like to listen to the broadcast from the beginning of the talk show. However, the driver knows that they do not start their commute to work until 6:45 am (15 minutes later). In one embodiment, the driver can use a client device (such as a personal computer having a client device 22b) to delay the program by 15 minutes. Here, the driver would submit an input into the client device 22b to request a delay of the broadcast content during a second time period. The home gateway 28 would then obtain a first segment of the content (e.g., the first 15 minutes of the broadcast) and then send the first segment of the content to the vehicular client device 22a. The first segment of the content received by the vehicular client device 22a would then be stored in the memory 52 of the client device 22a. The vehicular client device 22a would then store the second segment of the content (e.g., the remainder of the program) itself through its own content receiver 48. The controller 42 would couple together or overlap the first and second segments of the program to provide seamless playback to the user of the vehicular client device 22a.

In one embodiment, before sending a data message that requests delaying content to a later time, the controller 42 would determine whether the client device 22a in the vehicle is connected to, or capable of sending messages over, a first wireless communication system. This may be done by having the controller 42 determine whether the first wireless transceiver 50 is connected to a wireless gateway 28 in the home or a hot spot gateway 30 mentioned above. If the client device 22a in the vehicle is not connected to, or not capable of sending data messages over, a first wireless communication system, the controller 42 may then make a determination whether the client device 22a in the vehicle is connected to, or capable of sending data message over, a second wireless communication system. The second wireless communication system in FIG. 2 is shown as a cellular wireless transceiver 72 in the Telematics control unit 70 and in FIG. 5 as a cellular wireless transceiver 116 in a portable wireless communication device 110. If the client device 22a is not connected to either the first or second communication system, then the controller 74 may store the data message for later transmission.

The data message may be formatted in a number of ways. In one embodiment, the information in the data message will depend on the type of content being played by the driver of the vehicle. For instance, assume that the content receiver 48 is a digital satellite receiver and that the type of content to be delayed is digital broadcast content. In this case, the data message may include a plurality of information elements or fields that includes at least a delay content instruction and a satellite channel identification. To enhance the functionality of the system, the data message may also include other information elements or fields such as an address (for identifying a host for the driver's content), a client device identification, a user identification, and a date and a time that the user selected the delay content command. This later information may be used to delay content that is not readily storable as well as provide specific information to a user about stored content for later selection.

In another instance, assume that the content receiver 48 is a radio tuner and the type of content to be delayed is analog broadcast content. In this case, the data message may include a plurality of information elements or fields that includes at least a delay content instruction and radio frequency identification. Additionally, to enhance functionality, the data message may also include other information elements or fields such as an address (for identifying a host for the driver's content), a client device identification, a content type identification, a user identification, and a date and a time that the user selected the delay content command.

Figure 6:
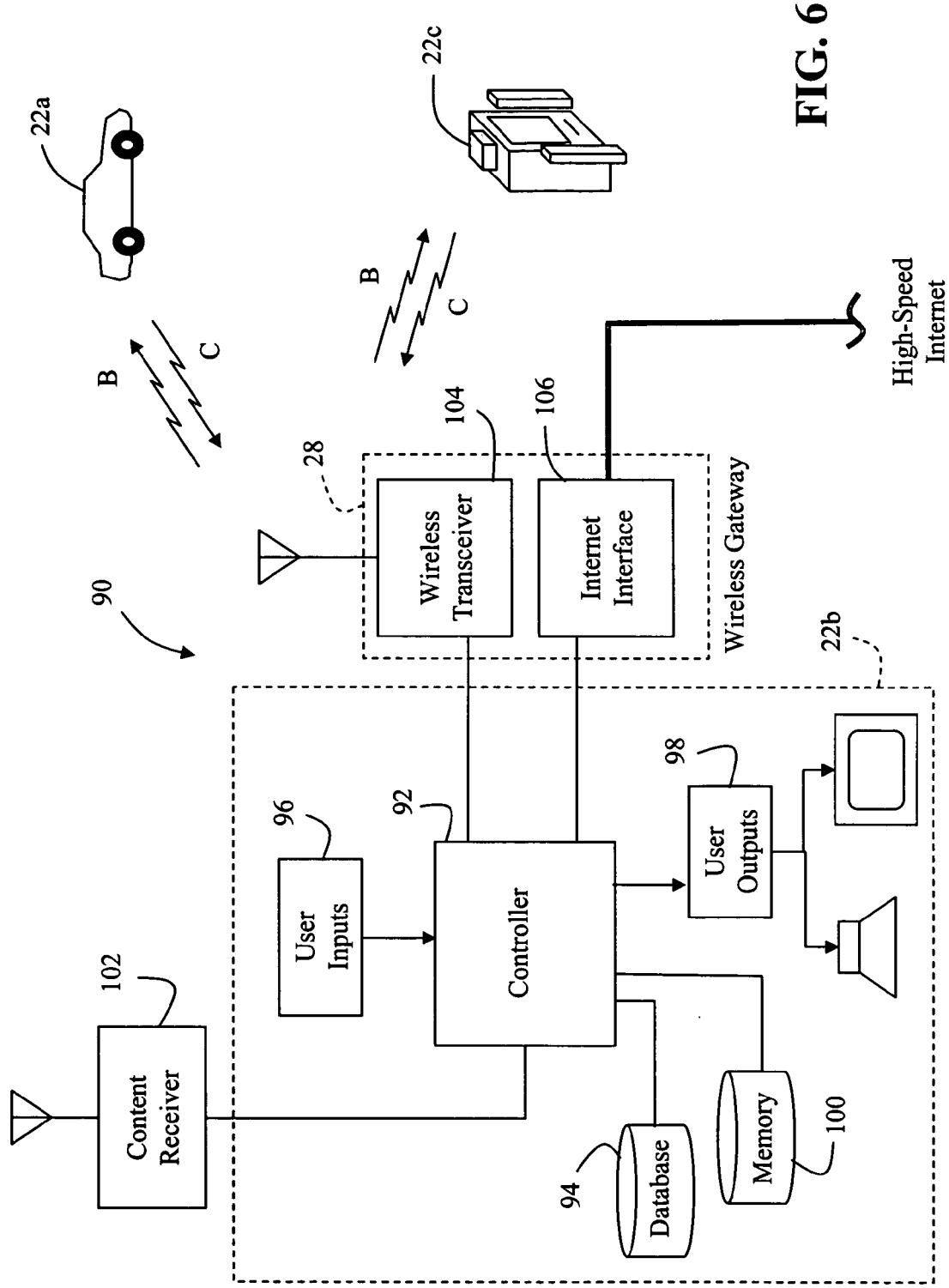
FIG. 6 is a block diagram of one embodiment of a host system that communicates with different client devices in different domains.

FIG. 6 shows a block diagram of one embodiment of a remote host system 90 for managing content for purposes of delaying or time-slipping content across domains. In one embodiment, the remote host system includes a wireless gateway 28, a controller 92, and a database 94. Additionally, the system 90 may include other components such as a user inputs 96, user outputs 98, other memory 100, and a content receiver 102. In one embodiment, components of the host system may be included in one of the client devices 22*b*, such as a home personal computer. However, one skilled in the art having the benefit of this disclosure will recognize that aspects of the host system, and components thereof, can be combined or swapped with other types of devices and systems. For instance, instead of having the remote host system located in the home, the controller 92, database 94, and memory 100 may be located and managed remotely by the central service provider 24.

The wireless gateway 28 may include a wireless transceiver 104 and an Internet interface 106. In one embodiment, the wireless transceiver 104 is capable of wirelessly connecting to the first and second client devices 22*a*, 22*c* over a short-range wireless communication system through a system described above. The Internet interface 106 may be used for communicating with a central service provider 24. The connection with the central service provider 24 may also be used to facilitate communications with the first and second client device 22*a*, 22*c*, if the client devices are connected to other wireless gateways (such as a hot spot gateway 30) or connected to another wireless communication system (such as a cellular communication system). Moreover, the connection with the central service provider 24 may be used to facilitate access to content providers in addition to, or separate from, the content receiver 102.

In any event, in addition to transferring stored broadcast content to client devices, the wireless gateway 28 is used to receive data messages from the first and second client devices 22*a*, 22*c*, including any data messages that have an instruction to delay broadcast content. In one embodiment, as described above, data messages that are received from a client device include a plurality of information elements or fields that include at least a delay content instruction. If the content is broadcast content, the data message may further include information elements or fields that identify the type of client device, identify the content (a specific satellite channel or a radio frequency), and identify the time and date of the delay instruction.

The database 94 is used by the system to store information regarding features and operations of the different client devices 22*a–d*. The database 94 may also be used to store user preferences and keep track of user stored content. The database 94 may be configurable by the user to facilitate the storage and delay of content for different client devices 22*a–d* in various domains. For instance, the database 94 may identify the different types of client devices 22*a–d*, associated with a particular user. Referring to FIG. 7, the database 94 may also include information specific to individual client devices 22*a–d* such as: the client device identification (122); the client type (124); the domain (126); whether the client device has a short-range transceiver (128); whether the client device has a cellular transceiver (130); the size of memory on the client device (132); whether the client device retains stored content (134); whether the client device has access to Internet content (136); whether the client device has access to satellite content (138); whether the client device has access to RF radio content (140); and whether the client device has access to cable television (142).

Referring back to FIG. 6, the host controller 92 is connected to the wireless gateway 28 and the database 94. The host controller 92 is capable of receiving data messages from a first client device 22*a* and then using the database 94 to identify other client devices 22*b–d* associated with a specific user. As mentioned above, the data message will include an instruction to delay content and associated information about the delayed content. In one embodiment, the controller 92 is capable of generating and sending a second set of data messages to other client devices 22*b–d* after receiving the data message from the first client device 22*a*.

In another embodiment, the host controller 94 is capable of accessing content from the central service provider 24 in response to receiving the data message (containing the delay instruction) from the first client device 22*a*. This feature may be beneficial if the other client devices 22*b–d* do not have their own content receiver or is unable to store their own content at the scheduled time of the original broadcast. Additionally, after accessing content from the central service provider 24, the controller 92 may locally store the content in memory 100 or pass the content onto the other client devices 22*c*, 22*d* connected to the host system 90.

Figure 8:
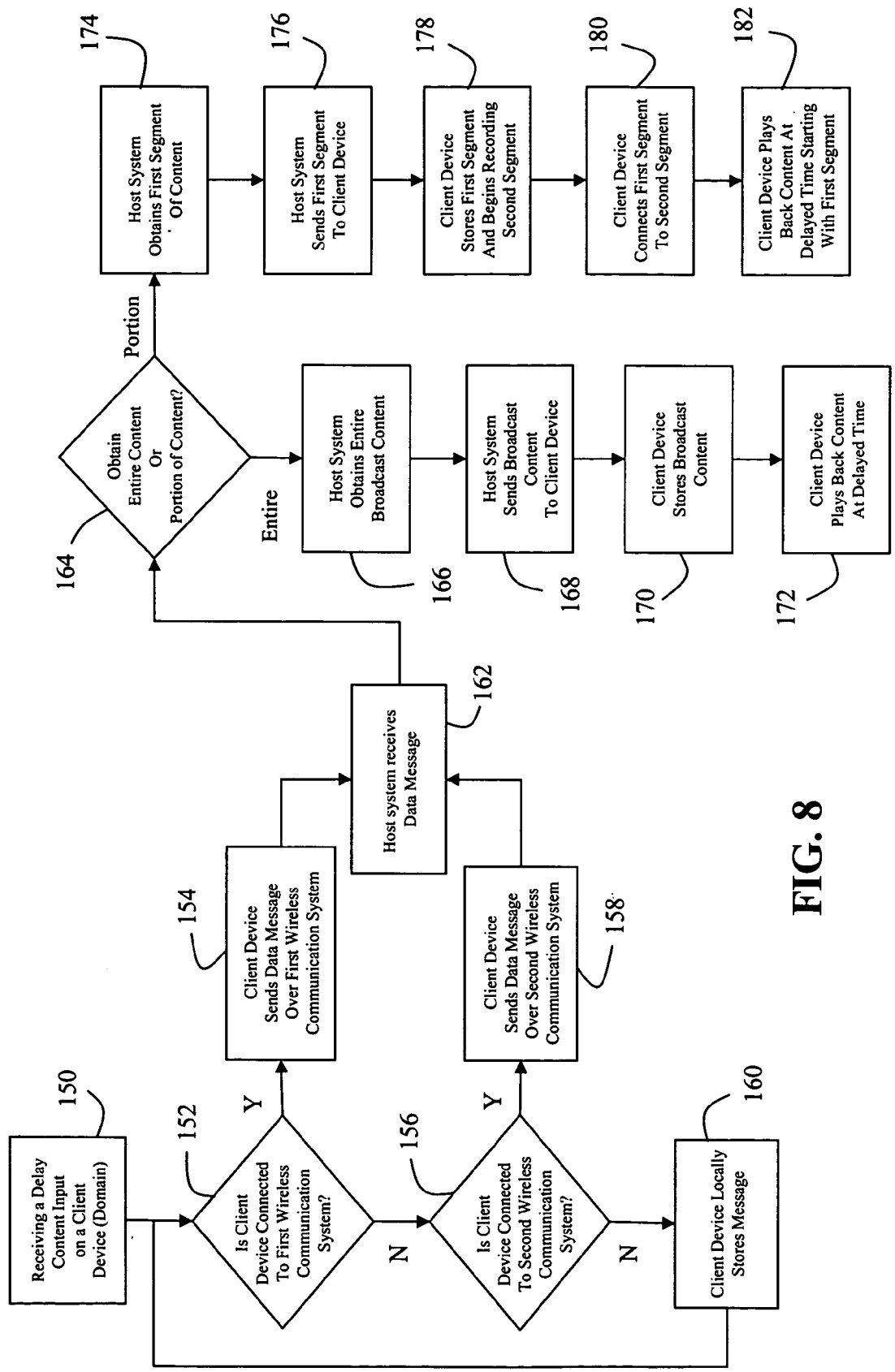
FIG. 8 is a flow diagram of one method for managing broadcast content and providing for the ability of delaying the broadcast content for a later time.

FIG. 8 shows a flow diagram illustrating one embodiment of a method for managing content that is scheduled for broadcast during a first time period (e.g., original broadcast time). In one embodiment, the method includes a process block 150 that receives an input from a user on the client device to delay the content. As mentioned above, this input may be an instruction by the user to delay the content (e.g., by pressing a button on a keypad or a dedicated delay button 54). The process then proceeds to decision block 152.

At decision block 152, the client device will make a determination whether the client device is connected to a first wireless communication system. In the context of embodiment described in FIGS. 2 and 3, this may include having the controller 42 determine whether a short-range wireless transceiver 50 is connected to another short-range communication device such as to a home wireless gateway 28 or a hot spot gateway 30. If the client device is connected to the first wireless communication system, then the process proceeds to process block 154.

At process block 154, the client device will generate and transmit a data message over the first communication system to a host system. In one embodiment, as described above, the data message may depend on the type of content being played by the user of the client device. For instance, assume that the type of content to be delayed is broadcast content from a satellite radio provider. In this case, the data message may include a plurality of information elements or fields that includes at least a delay content instruction and a broadcast content identification (such as a satellite channel). To enhance the functionality of the system, the data message may also include other information elements or fields such as an address, a client device identification, a content type identification, a user identification, and a date and a time that the user selected the delay content command.

If the client device is not connected to the first wireless communication system, then the process proceeds to decision block 156. In one embodiment, a determination is then made whether the user is capable of connection through a second wireless communication system. As described above, this may be accomplished by having the controller 42 determine whether a data message may be transmitted via a cellular wireless transceiver 72 in a connected Telematics control unit 70 (see FIG. 2). Alternatively, this may be accomplished by having the controller 42 determine whether a data message may be transmitted via a cellular wireless transceiver 116 in a wirelessly connected communication device 110 (see FIG. 5). Moreover, the decision on whether the user is capable of connecting to a second wireless communication system may include a determination of whether the user has subscribed to preferred services plan of the central service provider 24. If so, the process proceeds to process block 158 and where the client device will generate and send a data message over the second communication system.

If the client device is not connected to the first wireless communication system or the second wireless communication system, then the client device 22a will generate a data message but will store the data message instead of immediately transmitting the data message (block 160). The process will return to decision blocks 152 and 156 to wait until the client device is connected to the first or second wireless communication system.

Once the data message is transmitted, at process block 162, the host system 90 will receive the data message from the client device over the first communication system or the second communication system. As mentioned above, the first communication system may be a short-range wireless communication system transmitted directly to a home gateway 28 or to the home gateway 28 through a remote hot spot gateway 30. The second communication system may be a cellular system that transmits the message to the host system 90 through a cellular network. In response, the host system 90 will obtain the content that is being delayed. As explained above, the content may be obtained from a variety of sources depending on the type of content being sought. For instance, the broadcast content can be obtained over an Internet connection 106. The broadcast content can also be obtained from a content receiver 102 such as a digital satellite receiver or a radio tuner. Any obtained content may then be sent to the client device for later playback to the user at the designated time for the delay or time-slip.

In one embodiment, the host system may further make a determination of whether the entire content can be obtained or only a portion of the content. This feature is particularly useful where the delay time is relatively short. For instance, when the original broadcast is still playing during the delay time period. Accordingly, at decision block 164, the host system 90 may determine whether the entire content can be obtained or only a portion of the content. If the entire broadcast can be obtained, then the process continues to block 166.

At process block 166, the host system 90 will obtain the entire broadcast content. In process block 168, the host system 90 will then send or transmit the broadcast content to the client device 22a. The client device 22a may be the same client device that made the delay request or may be a different client device 22b–d of the user. The broadcast content may be sent to the client device 22a through the home wireless gateway 28 or through a hot spot gateway 30, depending on the location of the client device 22a. At process block 170, the client device 22a will then store the broadcast content in its memory 52. The client device 22a will playback the content at the specified second time period (e.g., the delayed time period) in process block 172.

Referring back to decision block 164, if it is determined that only a portion of the content can be obtained by the host system 90, the process will then proceed to block 174 where the host system 90 will obtain a first segment of the broadcast content. At process block 176, the host system 90 will then send the first segment of the broadcast content to the client device 22a (or another designated client device 22b–d). Again, the first segment of the broadcast content may be sent to the client device 22a through the home wireless gateway 28 or through a hot spot gateway 30, depending on the location of the client device 22a. In process block 178, the client device 22a will store the first segment of the broadcast content that it received from the host system 90 and then begin recording the second segment of the broadcast content. At process block 180, the controller 42 of the client device 22a will then connect the stored first segment and the recording second segment to provide seamless playback to the user of the client device 22a. The client device 22a will playback the content at the specified second time period (e.g., the delayed time period) in process block 182, beginning with the start of the first segment.

Figure 9:
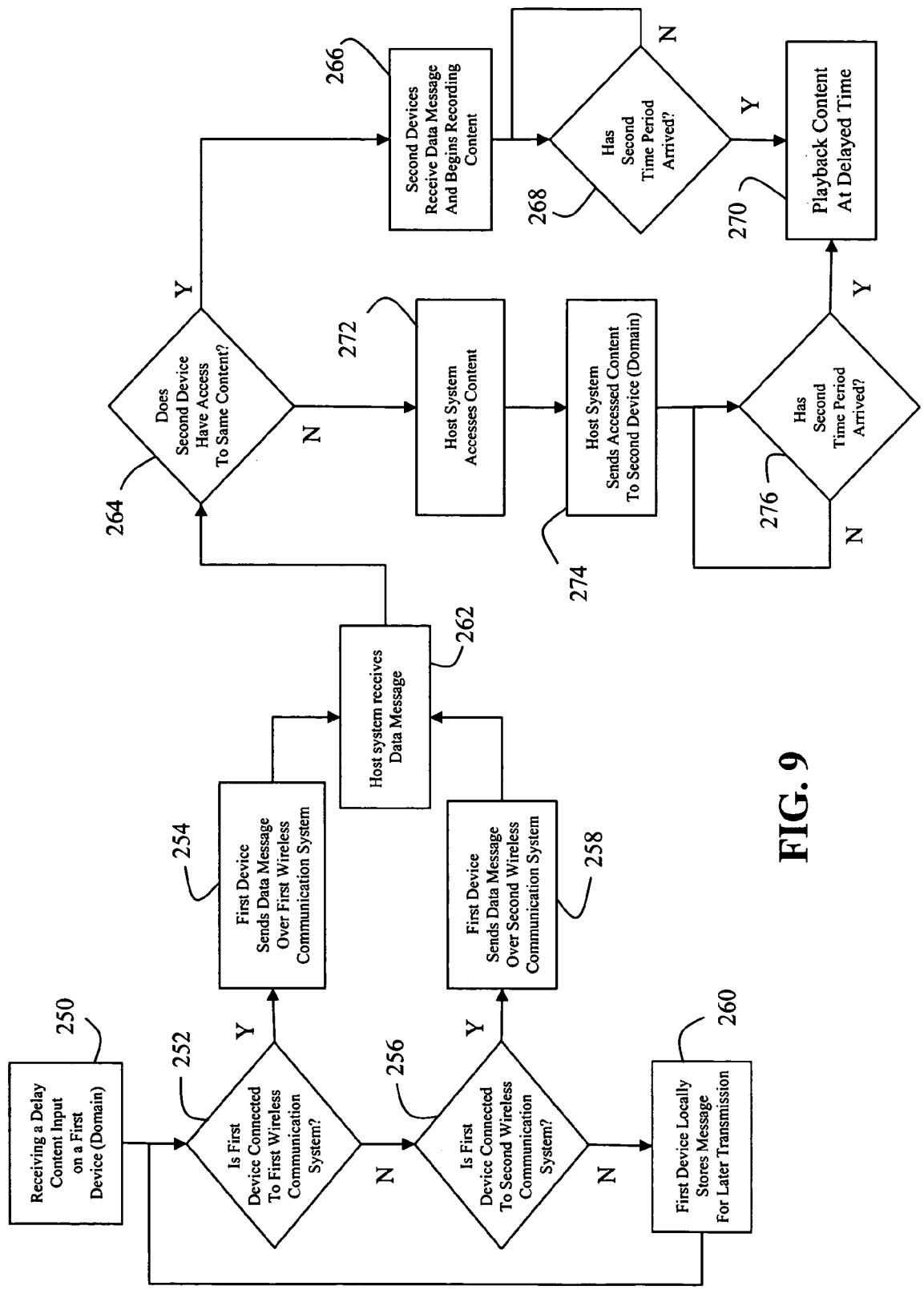
FIG. 9 is a flow diagram of another method for managing content between a first client device and a second client device.

FIG. 9 shows a flow diagram illustrating a further embodiment of a method for managing content that is scheduled for broadcast during a first time period (e.g., original broadcast time). This method is similar to the one described with relation to FIG. 8, but provides for the exchange of information between different client devices in different domains. In one embodiment, the method includes a process block 250 that receives an input from a user on a first device to delay the content. As mentioned above, this input may be an instruction by the user to delay the content (e.g., by pressing a button on a keypad or a dedicated delay button 54). The process then proceeds to decision block 252.

At decision block 252, the first device will make a determination whether the first device is connected to a first wireless communication system. In the context of embodiment described in FIGS. 2 and 3, this may include having the controller 42 determine whether a short-range wireless transceiver 50 is connected to another short-range communication device such as to a home wireless gateway 28 or a hot spot gateway 30. If the first device is connected to the first wireless communication system, then the process proceeds to process block 254.

At process block 254, the first device will generate and transmit a data message over the first communication system to the host system 90. In one embodiment, as described above, the data message may depend on the type of content being played by the user of the first device. For instance, assume that the type of content to be delayed is digital broadcast satellite content. In this case, the data message may include a plurality of information elements or fields that includes at least a delay content instruction and a broadcast content identification (such as a satellite channel). To enhance the functionality of the system, the data message may also include other information elements or fields such as an address, a client device identification, a content type identification, a user identification, and a date and a time that the user selected the delay content command.

If the first device is not connected to the first wireless communication system, then the process proceeds to decision block 256. In one embodiment, a determination is then made whether the user is capable of connection through a second wireless communication system. As described above, this may be accomplished by having the controller 42 determine whether a data message may be transmitted via a cellular wireless transceiver 72 in a connected Telematics control unit 70 (see FIG. 2). Alternatively, this may be accomplished by having the controller 42 determine whether a data message may be transmitted via a cellular wireless transceiver 116 in a wirelessly connected communication device 110 (see FIG. 5). Moreover, the decision on whether the user is capable of connecting to a second wireless communication system may include a determination of whether the user has subscribed to preferred services plan of the central service provider 24. If so, the process proceeds to process block 258 and where the first device will generate and send a data message over the second communication system.

If the first device is not connected to the first wireless communication system or the second wireless communication system, then the first device 22a will generate a data message but will store the data message instead of immediately transmitting the data message (block 260). The process will return to decision blocks 252 and 256 to wait until the first device is connected to the first or second wireless communication system.

Once the data message is transmitted, at process block 262, the host system 90 will receive the data message from the first device over the first communication system or the second communication system. As mentioned above, the first communication system may be a short-range wireless communication system transmitted directly to a home gateway 28 or to the home gateway 28 through a remote hot spot gateway 30. The second communication system may be a cellular system that transmits the message to the host system 90 through a cellular network. In response, the host system 90 will generate and send a second data message to other second devices. As explained below, the second data message may be a modified data message that is addressed directly to the second devices associated with the user of the first device and based on the features and capabilities of the second device.

For instance, at decision block 264, the host system 90 may determine from the database 94 whether the second device 22c has access to the content that the user desires to be stored. If the second device has direct access to the same content, then at process block 266, the second device will receive a data message from the host system 90. The data message may include a plurality of information elements or fields that includes at least a delay content instruction and other instructional information. For instance, if the second device has a satellite receiver, the data message may also include a satellite channel and the time period for the original broadcast of the content. To enhance the functionality of the system, the data message may also include other information elements or fields such a first device identification, a user identification, and a date and a time that the user selected for the delay time period.

In response to the data message from the host system, the second device will then begin to record (or otherwise obtain) the broadcast content based on the information contained in the data message. In decision block 268, in one embodiment, the second device will wait until the second time period arrives (e.g., the delay time period) to playback the original broadcast content (block 270).

Alternatively, in process block 272, if the second device 22c does not have access to the same content or the second device 22c cannot obtain the broadcast content itself, then the host system 90 may record the content or access the content from a content service provider. The ability to access content from a content service provider can provide significant benefits to the user. For instance, if the data message originally sent to the host system is late (e.g., if the data message with the delay instruction was not sent immediately), the host system 90 may connect to a service provider to download the requested content. At process block 274, once the content is accessed by the host system 90, the host system 90 will transmit or send the accessed content to the second device. Here, the host system 90 may further use its database 94 of client devices to check memory constraints, user output abilities, and other characteristics of the second client device 22c. Depending on those characteristics or attributes, the host system 90 may format the content for playback on the second device 22c. The process then proceeds to decision block 276 and process block 270 where the second device resumes playback of the content at the specified delayed time period.

What has been described is a communication system in a vehicle that includes the capability of managing and controlling content between different devices in different domains. The system and method allow a user to delay the listening (or watching) of audio (or video) content to fit a user's personal schedule. The above description of the present invention is intended to be exemplary only and is not intended to limit the scope of any patent issuing from this application. The present invention is intended to be limited only by the scope and spirit of the following claims.

What is claimed is:

1. A method for managing content that is scheduled for broadcast during a first time period, the method comprising the steps of:
   receiving an input from a user on a first device to delay the content to a second time period, the second time period being different from the first time period;
   determining whether the first device is wirelessly connected to a first wireless communication system;
   sending a data message to a host controller if the first device is connected to the first wireless communication system, the data message comprising a plurality of information elements including at least a delay content instruction;
   obtaining the content scheduled for broadcast during the first time period to permit the user to playback the content during the second time period; and
   sending the obtained content to a second device to permit the user to playback the content during a second time period on the second device, the first device being in a domain that is different than the second device;
   wherein the first device being in a domain selected from a group consisting of at least the home, vehicle, and person.

2. The method in claim 1, wherein the step of obtaining the content includes the host controller obtaining the content through an Internet connection from a content provider.

3. The method in claim 1, wherein the step of obtaining the content includes the host controller obtaining the content through a digital satellite communication system.

4. The method in claim 3, wherein the plurality of information elements of the data message also includes at least a satellite channel identification.

5. The method in claim 1, wherein the step of obtaining the content includes the host controller obtaining the content through a radio tuner.

6. The method in claim 5, wherein the plurality of information elements of the data message also includes at least a radio frequency identification.

7. The method in claim 1, wherein the content is a broadcast program and the step of obtaining the content includes the step of determining whether to obtain the entire broadcast program or a portion of the broadcast program.

8. The method in claim 7, wherein the host controller obtains a first segment of the broadcast program if it is determined to obtain a portion of the broadcast program and sends the first segment of the broadcast program to the first device.

9. The method in claim 8, wherein the second device stores a second segment of the broadcast program and connects the first segment of the broadcast program to the second segment of the broadcast program.

10. The method in claim 9, wherein the second device begins to automatically play the broadcast program to the user at a beginning of the first segment during the second time period.

11. The method in claim 1 further comprising the step of storing the data message in the first device if it is determined that the data message is not connected to the first wireless communication system, the data message being sent to the host controller when it is determined that the first device is connected to the first wireless communication system.

12. The method in claim 1, wherein the first wireless communication system is selected from a group consisting of a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system.

13. The method in claim 12, wherein the first device has a first transceiver to communicate with the first wireless communication system and a second transceiver to communicate with a second wireless communication system.

14. The method in claim 13, wherein the second wireless communication system is a cellular communication system.

15. The method in claim 14 further comprising the steps of:
determining whether the first device is connected to the second wireless communication system if it is determined that the first device is not connected to the first wireless communication system;
sending the data message to the host controller if the first device is connected to the second wireless communication system.

16. The method in claim 15 further comprising the step of storing the data message in the first device if it is determined that the data message is not connected to the second wireless communication system, the data message being sent to the host controller when it is determined that the first device is connected to the first wireless communication system or the second wireless communication system.

17. The method in claim 13 further comprising the steps of:
determining whether the user of the first device has subscribed to a preferred service plan; and
connecting to the second wireless communication system if it is determined that the user of the first device has subscribed to the preferred service plan.

18. The method in claim 1 further comprising the steps of determining in the host controller a content type associated with the second device and formatting the content according to the content type associated with the second device before the step of sending the obtained content to the second device.

19. The method in claim 1 further comprising the step of sending at least a portion of the obtained content from the second device to a third device to permit the user to playback the content during the second time period on the third device.

20. The method in claim 1 further comprising the step of sending the obtained content to a plurality of client devices to permit the user to playback the content during a second time period on at least one of the client devices.

21. The method in claim 1, wherein the first device is selected from a group consisting of a vehicular entertainment system, a home entertainment system, and a portable electronic device.

22. A method for allowing a user to manage content for a first device of the user that is scheduled for broadcast during a first time period, the first device being in a first domain that is selected from a group consisting of at least the home, vehicle, and person, the method comprising the steps of:
wirelessly receiving at a system a data message from the first device over a wireless communication system, the data message being received in response to an input from the user on the first device to delay the content to a second time period, the second time period being different from the first time period;
obtaining the content scheduled for broadcast during the first time period, wherein the content is present on a second device of the user, and wherein the second device is coupled to the system; and
sending the content to the first device over the wireless communication system to permit the user to playback the content on the first device during the second time period;
wherein the data message comprises a plurality of information elements including at least a delay content instruction.

23. The method in claim 22, wherein the step of obtaining the content includes obtaining the content through an Internet connection.

24. The method in claim 22, wherein the step of obtaining the content includes obtaining the content through a digital satellite communication system.

25. The method in claim 24, wherein the plurality of information elements of the data message also includes at least a satellite channel identification.

26. The method in claim 22, wherein the step of obtaining the content includes obtaining the content through a radio tuner.

27. The method in claim 26, wherein the plurality of information elements of the data message includes at least a radio frequency identification.

28. The method in claim 22, wherein the content is a broadcast program and the step of obtaining the content includes the step of determining whether to obtain the entire broadcast program or a portion of the broadcast program.

29. The method in claim 28, wherein the step of obtaining the content includes obtaining a first segment of the broadcast program if it is determined to obtain a portion of the broadcast program.

30. The method in claim 22, wherein the wireless communication system is selected from a group consisting of a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system.

31. The method in claim 22, wherein the wireless communication system is a cellular communication system.

32. The method in claim 22 further comprising the steps of determining a content type associated with the first device and formatting the content in the content type associated with the first device before sending the content to the first device.

33. The method in claim 22, wherein the first device is selected from a group consisting of a vehicular entertainment system, a home entertainment system, and a portable electronic device.

34. A method for managing content between a first device and a second device that is scheduled for broadcast during a first time period, the first device being in a first domain and the second device being in a second domain, the first domain and the second domain selected from a group consisting of at least the home, vehicle, and person, the method comprising the steps of:
   receiving a data message from the first device over a wireless communication system, the data message being received in response to an input from a user on the first device to delay the content to a second time period, the second time period being different from the first time period;
   obtaining the content scheduled for broadcast during the first time period; and
   sending the content to the second device over the wireless communication system to permit the user to playback the content on the second device during the second time period.

35. The method in claim 34, wherein the step of obtaining the content includes obtaining the content through an Internet connection from a content provider.

36. The method in claim 34, wherein the step of obtaining the content includes obtaining the content through a digital satellite communication system.

37. The method in claim 36, wherein the plurality of information elements of the data message also includes at least a satellite channel identification.

38. The method in claim 34, wherein the step of obtaining the content includes obtaining the content through a radio tuner.

39. The method in claim 38, wherein the plurality of information elements of the data message also includes at least a radio frequency identification.

40. The method in claim 34, wherein the step of obtaining the content includes the step of determining whether the second device has access to the content.

41. The method in claim 40, wherein the step of obtaining the content includes the step of storing the content in a host system and sending the content to the second device if the second device does not have access to the content.

42. The method in claim 40, wherein the step of obtaining the content includes the step of generating and sending a second data message to the second device instructing to store the content if the second device has access to the content.

43. The method in claim 34, wherein the wireless communication system is selected from a group consisting of a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system.

44. The method in claim 34, wherein the wireless communication system is a cellular communication system.

45. The method in claim 34 further comprising the steps of determining a content type associated with the second device and formatting the content in the content type associated with the second device before sending the content to the second device.

46. The method in claim 34, wherein the first device and the second device is selected from a group consisting of a vehicular entertainment system, a home entertainment system, and a portable electronic device.

47. A client device in a communication system, the communication system being capable of managing content that is scheduled for broadcast during a first time period between the client device and other client devices, the client device and other client devices being in different domains, the domains selected from a group consisting of at least the home, vehicle, and person, the client device comprising:
   a user interface for receiving an input from a user to delay content to a second time period, the second time period being different from the first time period;
   a first wireless transceiver that is capable of wirelessly connecting the client device to a first wireless communication system;
   a controller, responsive to the input from the user to access the content during a second time period, for determining whether the client device is connected to the first wireless communication system and sending a data message to a remote host controller if the client device is connected to the first wireless communication system; and
   a memory for storing the content that is scheduled for broadcast during the first time period to permit the user to playback the content during the second time period, the content stored in the memory received from the remote host controller in response to the data message sent to the remote host controller;
   wherein the data message sent to the remote host controller comprises a plurality of information elements including at least a delay content instruction.

48. The client device in claim 47, wherein the first wireless communication system is selected from a group consisting of a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system.

49. The client device in claim 48 further comprising a second transceiver to communicate with a second wireless communication system.

50. The client device in claim 49, wherein the second wireless communication system is a cellular communication system.

51. The client device in claim 49, wherein the controller further determines whether the client device is connected to the second wireless communication system if it is determined that the client device is not connected to the first wireless communication system and sends the data message to the remote host controller if the client device is connected to the second wireless communication system.

52. The client device in claim 51, wherein the controller further stores the data message in the client device if it is determined that the data message is not connected to the second wireless communication system, the data message being sent to the remote host controller when it is determined that the client device is connected to the first wireless communication system or the second wireless communication system.

53. The client device in claim 47, wherein the client device is selected from a group consisting of a vehicular entertainment system, a home entertainment system, and a portable electronic device.

54. A host system for managing content for a mobile client device that is scheduled for broadcast during a first time period, the mobile client device being in a domain selected from a group consisting of at least the home, vehicle, and person, the host system comprising:

a wireless gateway for receiving a data message over a wireless communication system from the client device, the data message being received in response to an input from a user on the client device to delay the content to a second time period, the data message comprising a plurality of information elements including at least a delay content instruction;

a database for storing information regarding the client device; and a controller connected to the wireless gateway, the controller capable of identifying the client device from the database and obtaining the content scheduled for broadcast during the first time period;

wherein the controller sends the content to the client device over the wireless communication system to permit the user to playback the content on the client device during the second time period.

55. The host system in claim 54, wherein the controller obtains the content through an Internet connection from a content provider.

56. The host system in claim 54, wherein the controller obtains the content through a digital satellite communication system.

57. The host system in claim 56, wherein the information elements of the data message further including at least a satellite channel identification.

58. The host system in claim 54, wherein the step of obtaining the content includes obtaining the content through a radio tuner.

59. The host system in claim 58, wherein information elements of the data message further including at least a radio frequency identification.

60. The host system in claim 54, wherein the wireless communication system is selected from a group consisting of a Bluetooth™ communication system, an IEEE 802.11 communication system, an IEEE 802.16 communication system, an IEEE 802.20 communication system, a Wireless Universal Serial Bus (WUSB) system, or a Dedicated Short-Range Communications (DSRC) system.

61. The host system in claim 54, wherein the wireless communication system is a cellular communication system.

62. The host system in claim 54 wherein the controller is further capable of determining a content type associated with the client device and formatting the content in the content type associated with the client device before sending the content to the client device.

63. The method in claim 54, wherein the client device is selected from a group consisting of a vehicular entertainment system, a home entertainment system, and a portable electronic device.

64. A method for managing content for a first device that is scheduled for broadcast during a first time period, the first device being in a first domain that is selected from a group consisting of at least the home, vehicle, and person, the method comprising the steps of:

receiving a data message from a user, the data message being received in response to an input from the user to delay the content to a second time period, the second time period being different from the first time period;

obtaining the content scheduled for broadcast during the first time period;

determining a content type associated with the first device and formatting the content in the content type associated with the first device before sending the content to the first device; and wirelessly sending the content to the first device over a wireless communication system to permit the user to playback the content on the first device during the second time period;

wherein the data message comprises a plurality of information elements including at least a delay content instruction.

65. The method in claim 64, wherein the step of obtaining the content includes obtaining the content through an Internet connection from a content provider.

66. The method in claim 64, wherein the step of obtaining the content includes obtaining the content through a digital satellite communication system.

67. The method in claim 66, wherein the plurality of information elements of the data message also includes at least a satellite channel identification.

68. The method in claim 64, wherein the step of obtaining the content includes obtaining the content through a radio tuner.

69. The method in claim 68, wherein the plurality of information elements of the data message includes at least a radio frequency identification.

70. The method in claim 64, wherein the content is a broadcast program and the step of obtaining the content includes the step of determining whether to obtain the entire broadcast program or a portion of the broadcast program.

71. The method in claim 64, wherein the first domain is the vehicle domain and the data message is generated by a personal computer in a second domain, the second domain being different from the first domain.

72. The method in claim 64 further comprising the step of sending the content to a plurality of client devices to permit the user to playback the content on at least one of the client devices.

73. A method for managing content for a first device that is scheduled for broadcast during a first time period, the first device being in a first domain that is selected from a group consisting of at least the home, vehicle, and person, the method comprising the steps of:

receiving a first data message from a user, the first data message being received in response to an input from the user to delay the content to a second time period, the second time period being different from the first time period;

using a database to obtain information about the first device;

generating a second data message that comprises a plurality of information elements including at least a delay content instruction; and sending the second data message to the first device over a wireless communication system to permit the user to playback the content on the first device during the second time period.

74. The method in claim 73, wherein the plurality of information elements of the second data message also includes at least a satellite channel identification.

75. The method in claim 73, wherein the plurality of information elements of the second data message also includes at least a radio frequency identification.

76. The method in claim 73 further comprising the steps of determining a content type associated with the first device and the plurality of information elements of the second data message also includes at least information associated with the content type.

77. The method in claim 73, wherein the first domain is the vehicle domain and the first data message is generated by a personal computer in a second domain, the second domain being different from the first domain.

78. The method in claim 73 further comprising the step of sending the second data message to a plurality of client devices to permit the user to playback the content on at least one of the client devices.

* * * * *